US012016750B2

(12) United States Patent
Wiesman

(10) Patent No.: US 12,016,750 B2
(45) Date of Patent: Jun. 25, 2024

(54) BODILY FLUID TRANSPORTING UNIT

(71) Applicant: Wiesman Holdings, LLC, York, PA (US)

(72) Inventor: Jon Wiesman, York, PA (US)

(73) Assignee: Wiesman Holdings, LLC, York, PA (US)

( * ) Notice: Subject to any disclaimer, the term of this patent is extended or adjusted under 35 U.S.C. 154(b) by 0 days.

(21) Appl. No.: 16/134,225

(22) Filed: Sep. 18, 2018

(65) Prior Publication Data

US 2020/0085556 A1 Mar. 19, 2020

(51) Int. Cl.

*A61D 19/02* (2006.01)
*B65D 81/18* (2006.01)
*B65D 81/38* (2006.01)

(52) U.S. Cl.

CPC ......... *A61D 19/027* (2013.01); *A61D 19/025* (2013.01); *B65D 81/18* (2013.01); *B65D 81/3827* (2013.01)

(58) Field of Classification Search

CPC ....... F25D 3/08; A01N 1/0273; A01N 1/0268; A01N 1/0263; G01N 2001/005; B65D 81/3862; B65D 81/3827; A61J 1/16; A61J 1/165; A61D 19/025

See application file for complete search history.

(56) References Cited

U.S. PATENT DOCUMENTS

| | | | | |
|---|---|---|---|---|
| 4,303,610 A * | 12/1981 | Sardisco | B01L 1/52 | 422/430 |
| 4,619,678 A * | 10/1986 | Rubin | A61B 10/0096 | 422/944 |
| 5,983,661 A * | 11/1999 | Wiesman | F25D 3/08 | 62/371 |
| 6,230,515 B1 * | 5/2001 | Wiesman | A01N 1/02 | 62/371 |
| 6,405,556 B1 * | 6/2002 | Bucholz | F25D 3/06 | 165/201 |
| 6,675,605 B2 * | 1/2004 | Douglas-Hamilton | A01N 1/02 | 62/371 |
| 6,929,778 B2 * | 8/2005 | Nunes | G01N 1/405 | 422/430 |
| 9,289,355 B2 * | 3/2016 | Agren | A61J 1/06 | |
| 9,456,956 B1 * | 10/2016 | Webster | A61J 1/2065 | |
| 9,522,097 B2 * | 12/2016 | Tennican | A61J 1/201 | |
| 10,065,784 B2 * | 9/2018 | Tanoguchi | A61J 1/16 | |
| 10,350,141 B2 * | 7/2019 | Metz | B65B 3/003 | |
| 2007/0186580 A1 * | 8/2007 | Kaplan | A23L 3/36 | 62/457.5 |
| 2015/0239640 A1 * | 8/2015 | Smith | A01N 1/0273 | 220/592.2 |
| 2018/0140767 A1 * | 5/2018 | Fontecchio | A61M 5/002 | |

* cited by examiner

*Primary Examiner* — Christopher R Zerphey
(74) *Attorney, Agent, or Firm* — Barley Snyder

(57) ABSTRACT

A bodily fluid transporting unit that includes a container with a syringe housing and a refrigerant pack in the container. The container is covered by a lid and the engagement of the container and the lid results in an air-tight and moisture-tight bodily fluid transporting unit.

12 Claims, 13 Drawing Sheets

BODILY FLUID TRANSPORTING UNIT

FIELD OF THE INVENTION

The present invention relates, in general, to thermally insulated transport containers and, in particular, to such containers in which spermatozoa semen can be maintained motile and fertile and, thus, render it possible to effectively transport this type of material over long distances.

BACKGROUND

Transporting semen (germplasm), for example equine or canine semen, is beneficial to breeders for several reasons. Shipping semen is less costly than transporting female horses or dogs to an unfamiliar facility. Stress and risk of disease are minimized when female horses or dogs can remain at home. Further, using artificial insemination allows a stallion to service more mares than he could using natural service and allows the stallion to continue to show or perform during the breeding season. When shipped semen is handled properly, pregnancy rates approach those achieved using natural service.

Semen destined for transport is collected from a male, examined, and cooled for shipment. The development of conventional systems allowing controlled cooling has been instrumental. The advantages of using cooled semen make it a valuable addition to breeding programs and has been used to increase the genetic pool in many breeds.

However, numerous factors influence pregnancy rates achieved when mares are bred with transported cooled stallion semen. For instance, sperm are very sensitive to many environmental factors, including temperature, light, physical trauma, and a variety of chemicals. Any factor that impacts the ability of sperm to resist environmentally-induced damage will adversely affect fertility achieved when using cooled transported semen. Semen must be handled from collection to insemination in such a manner as to not shock nor damage the sperm. If collection or storage devices are contaminated by bacteria, chemicals, or even soap residue, the survivability of the sperm cells can be severely diminished. Proper temperature control of semen prior to cooling and prior to insemination is crucial. For example, if semen is initially mixed with extender that is too cool or too warm, damage will likely occur.

Mares will ovulate 24 to 48 hours before the end of heat and pregnancy rates from cooled stallion semen are the highest when mares are inseminated within 24 hours following semen collection. Some stallion semen is still highly viable up to 48 hours following collection. Semen transported and stored for up to 72 hours may appear to have good motility, but fertilization capabilities are typically poor. Thus, when it is required to transport equine semen samples over long distances or even overseas, it is typically necessary to maintain the motility and fertility of the spermatozoa for 48 hours, at the very minimum, and ideally for more than 72 hours, in order that a sample reaches its destination and can be effectively used.

Although semen specimens can be transported for such prolonged periods of time if special motorized refrigeration units are used, the costs of such apparatus and the weight penalties incurred when air mail/freight is involved, are excessive. Thus, there has been an ongoing desire for improved, inexpensive, and disposable containers that are self-contained, passively cooled, and sufficiently light to enable ready dispatch by conventional delivery/mail services.

Spermatozoa from most animal species are susceptible to irreversible damage if exposed to a sudden drop in temperature, also known as "cold shock." It is known that stallion spermatozoa are more susceptible to cold shock than bovine, ovine, or porcine spermatozoa. Cold shock is generally considered to be the result of rapid cooling from 20 degree C. to 8 degree C. It is known that semen can be cooled relatively quickly from about 37 degree C. (99 degree. F.) down to about 20 degree C., but must be slow cooled at a rate of 0.05 C. degree/min from 20 degree C. to 5.degree. C. (47 degree. F.).

Establishing and maintaining the proper cooling rate of the refrigerant/coolant to which the semen is exposed is among the main requirements of a bodily fluid transporting unit. Also of great interest are toxicity of the refrigerant/coolant and the exposure of the semen to moisture that may cause certain types of microorganisms to spawn, so that maintenance of aseptic conditions can very difficult. In addition, maintaining the motility and fertility of the transported spermatozoa for at least 48 hours is required.

SUMMARY

A bodily fluid transporting unit, constructed in accordance with the present invention, includes a container having a chamber and a syringe housing and a refrigerant pack in the chamber of the container. The syringe housing has a passage that extends along the length of the syringe housing and is defined by resilient walls. The syringe is friction-fit in the passage of the syringe housing. A bodily fluid transporting unit, constructed in accordance with the present invention, also includes a lid so mated with the container and closing the chamber of the container that the chamber of the container is air-tight and moisture-tight.

DETAILED DESCRIPTION OF THE EMBODIMENT(S)

Figure 1:
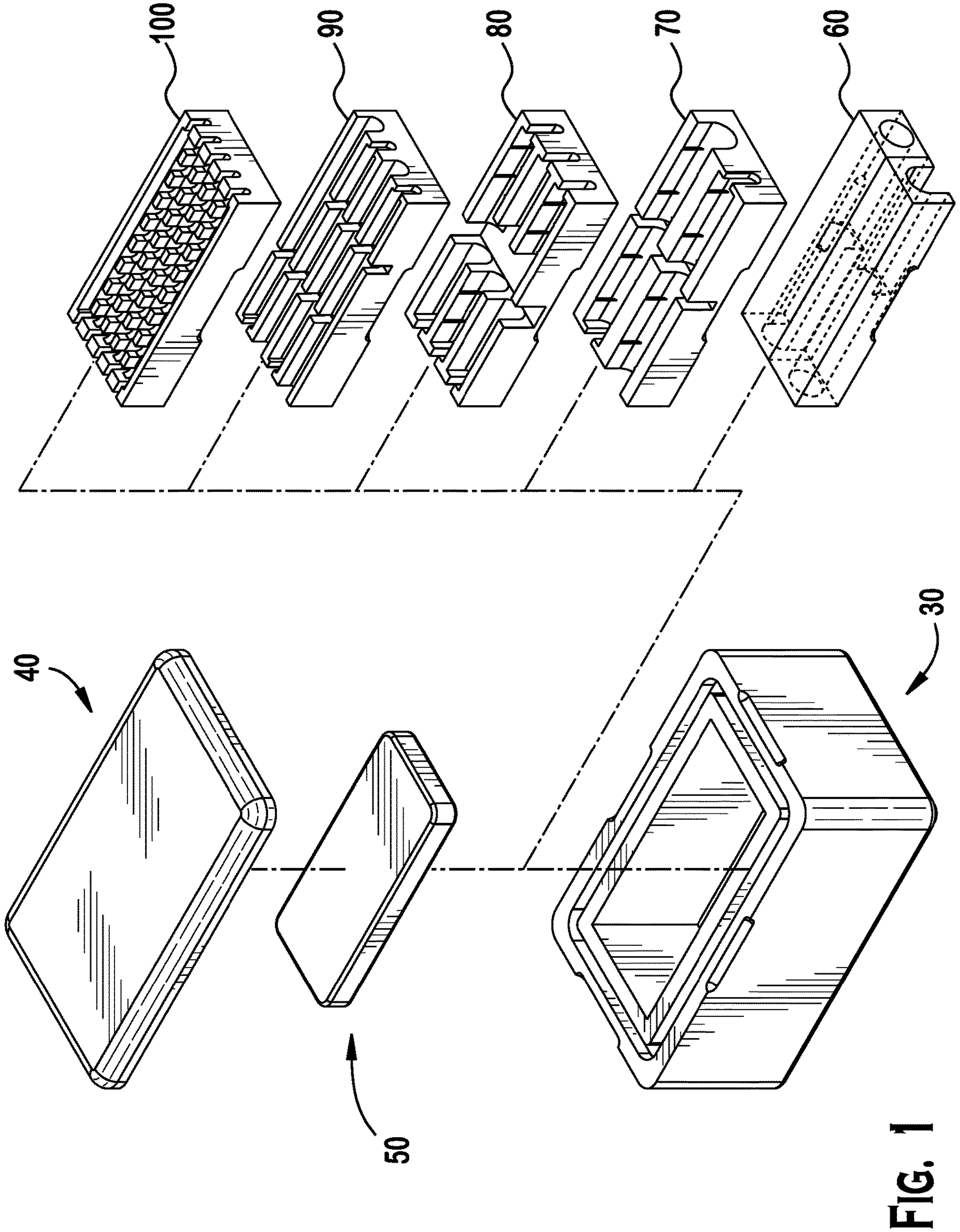
FIG. 1 is an exploded perspective view of a bodily fluid transporting unit constructed in accordance with the present invention.
Figure 2:
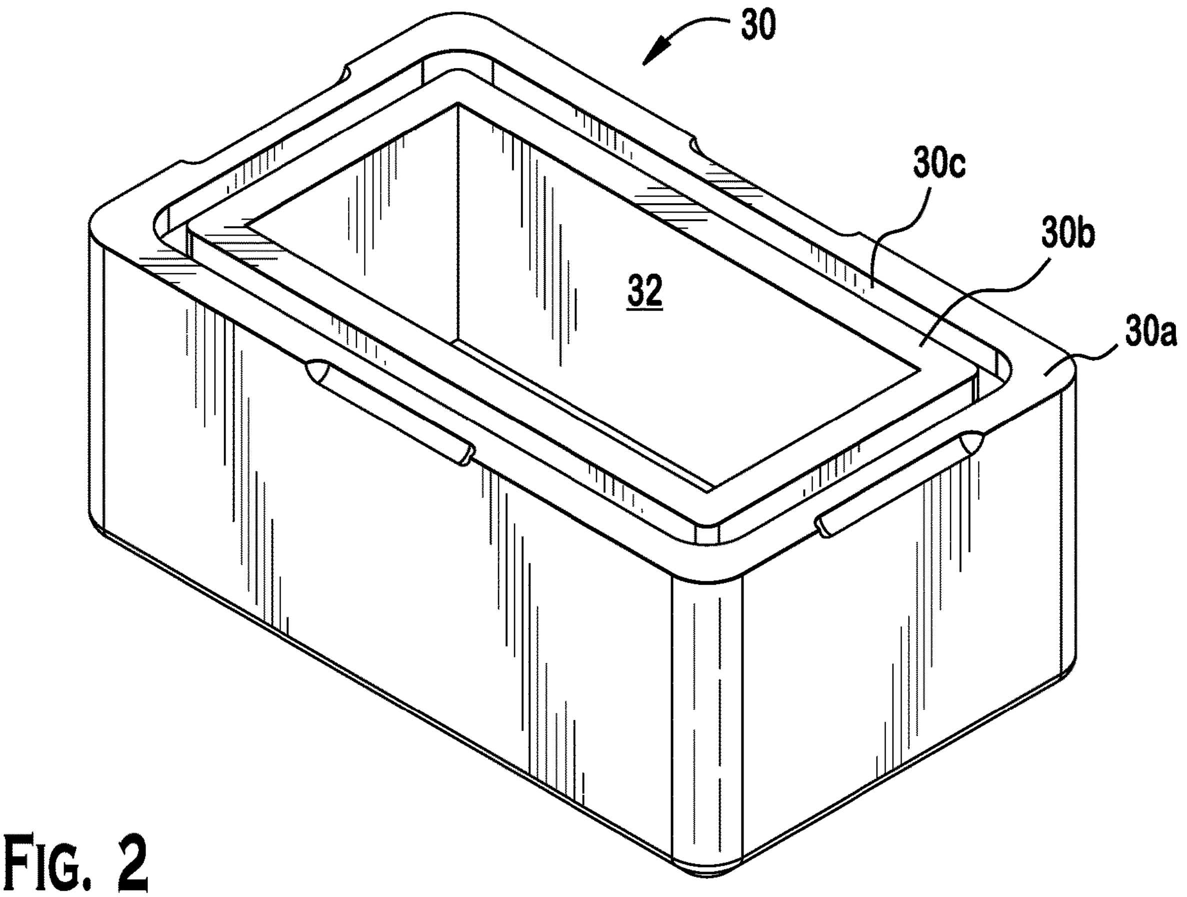
FIG. 2 is a perspective view of a container in a bodily fluid transporting unit constructed in accordance with the present invention.
Figure 3:
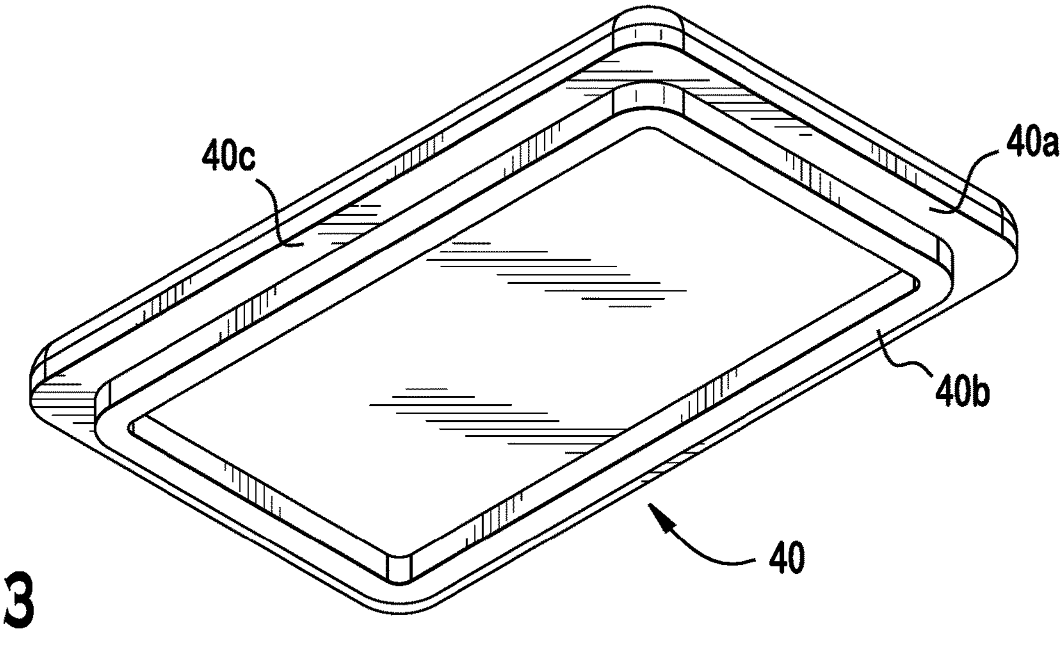
FIG. 3 is a perspective view of a lid in a bodily fluid transporting unit constructed in accordance with the present invention.

Referring to FIGS. 1 through 5, a bodily fluid transporting unit, constructed in accordance with the present invention, includes a container 30, a lid 40, a refrigerant pack 50, and a syringe housing. Five syringe housings 60, 70, 80, 90, and 100 having different configurations are illustrated in FIG. 1.

Container 30 has a chamber 32 into which refrigerant pack 50 and a syringe housing are placed. Top surface 30*a* of container 30 has a ridge 30*b* circumferentially surrounding chamber 32 of the container 30 and a groove 30*c* circumferentially surrounding ridge 30*b*. The outer edges of top surface 30*a* of container 30 surround groove 30*c* of the container 30. Container 30 is preferably made from a rigid foamed plastic.

Lid 40 has a bottom surface 40*a* that has a ridge 40*b* that is sized and located to extend into groove 30*c* in container 30. Lid 40 also has a step 40*c* circumferentially surrounding ridge 40*b* and bears against top surface 30*a* of container 30. Ridge 30*b* of container 30 is sized and located to fit tightly against the inside surface of ridge 40*b* of lid 40 after refrigerant pack 50 and a syringe housing are placed in the container 30 to close the container 30 with the lid 40. The mating of container 30 and lid 40 results in chamber 32 of the container 30 being air-tight and moisture-tight. Lid 40 is preferably made from a rigid foamed plastic. A syringe 42 is shown in dashed lines in FIG. 4.

Figure 4:
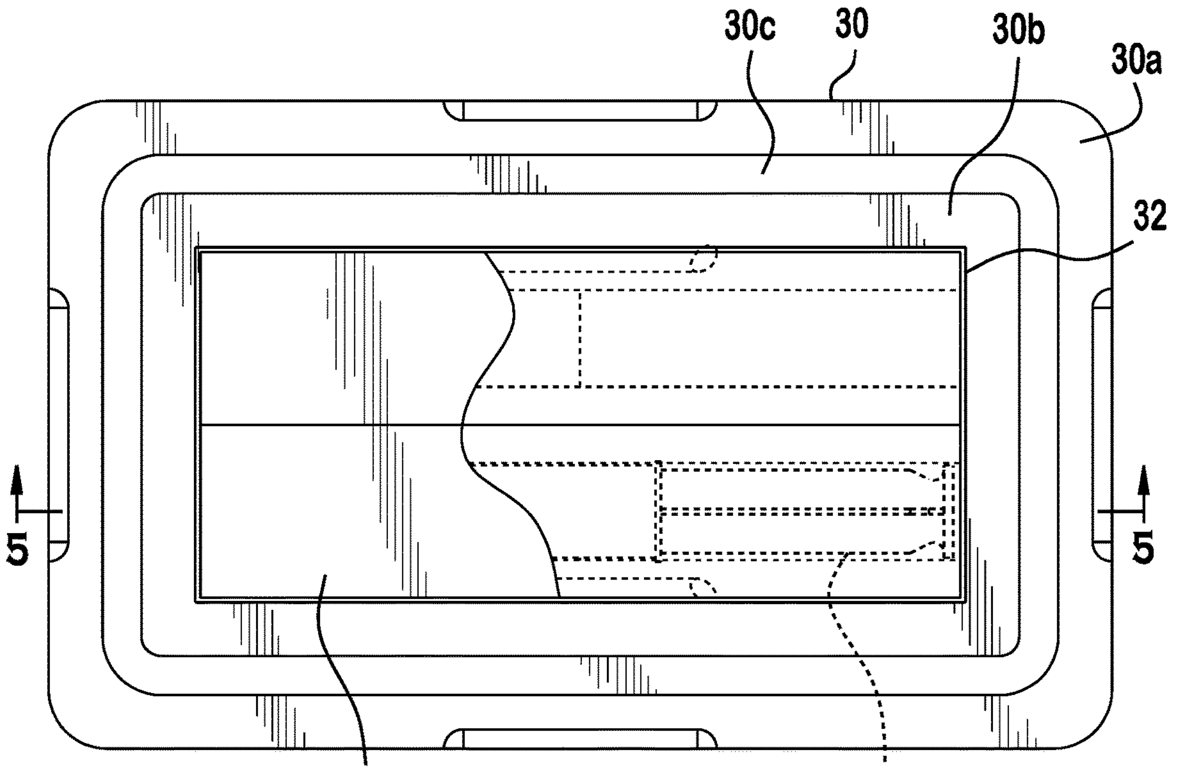
FIG. 4 is a top view of the FIG. 2 container with a syringe housing and a refrigerant pack resting in the container in accordance with the present invention.
Figure 5:
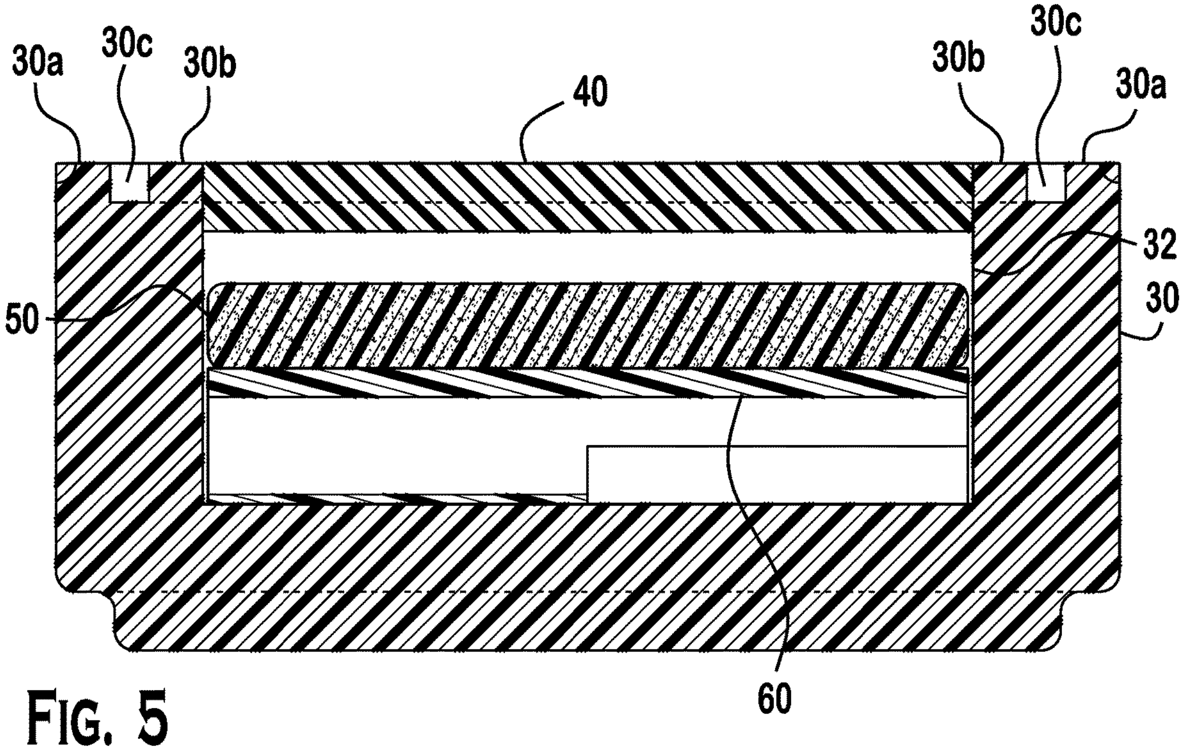
FIG. 5 is a cross-section view of the FIG. 4 container taken along line 5-5 of FIG. 4.
Figure 6:
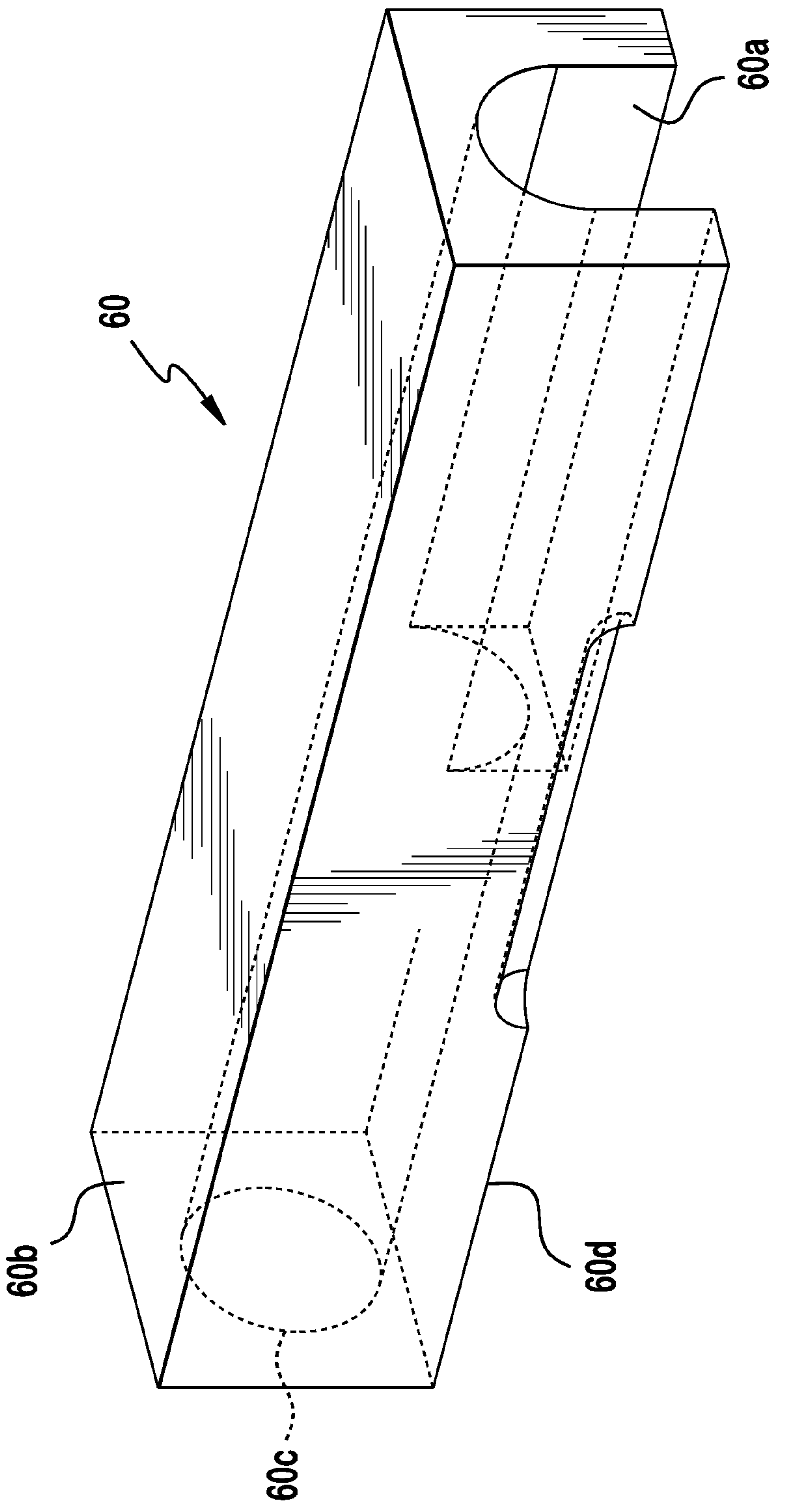
FIG. 6 is a perspective view of a first embodiment of a syringe housing of a bodily fluid transporting unit constructed in accordance with the present invention.
Figure 7:
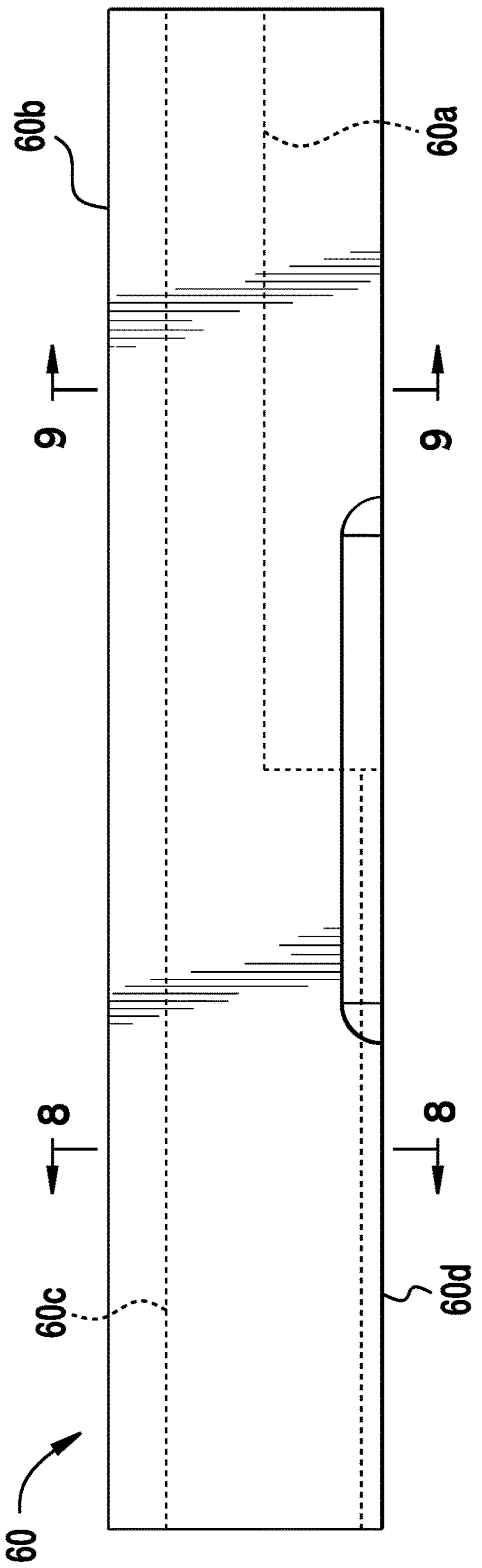
FIG. 7 is side view of the FIG. 6 syringe housing.
Figure 9:
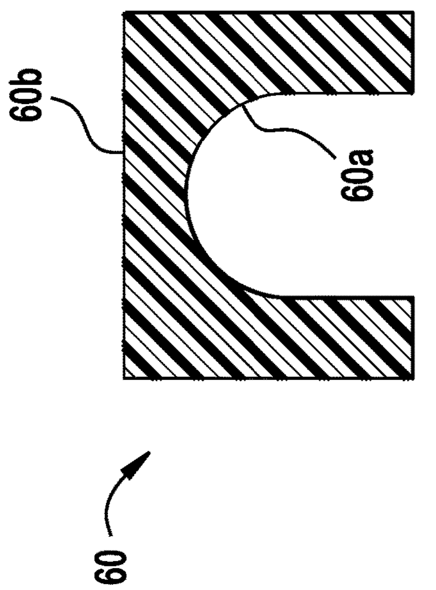
FIG. 9 is a cross-section view of the FIG. 6 syringe housing taken along line 9-9 of FIG. 7.
Figure 8:
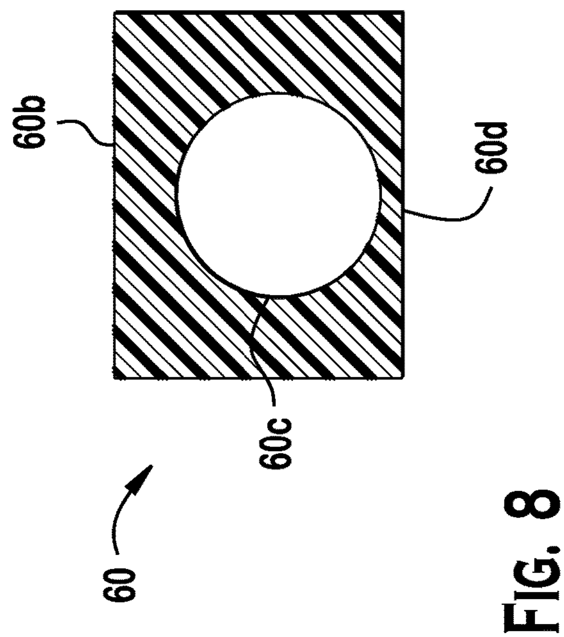
FIG. 8 is a cross-section view of the FIG. 6 syringe housing taken along line 8-8 of FIG. 7.
Figure 10:
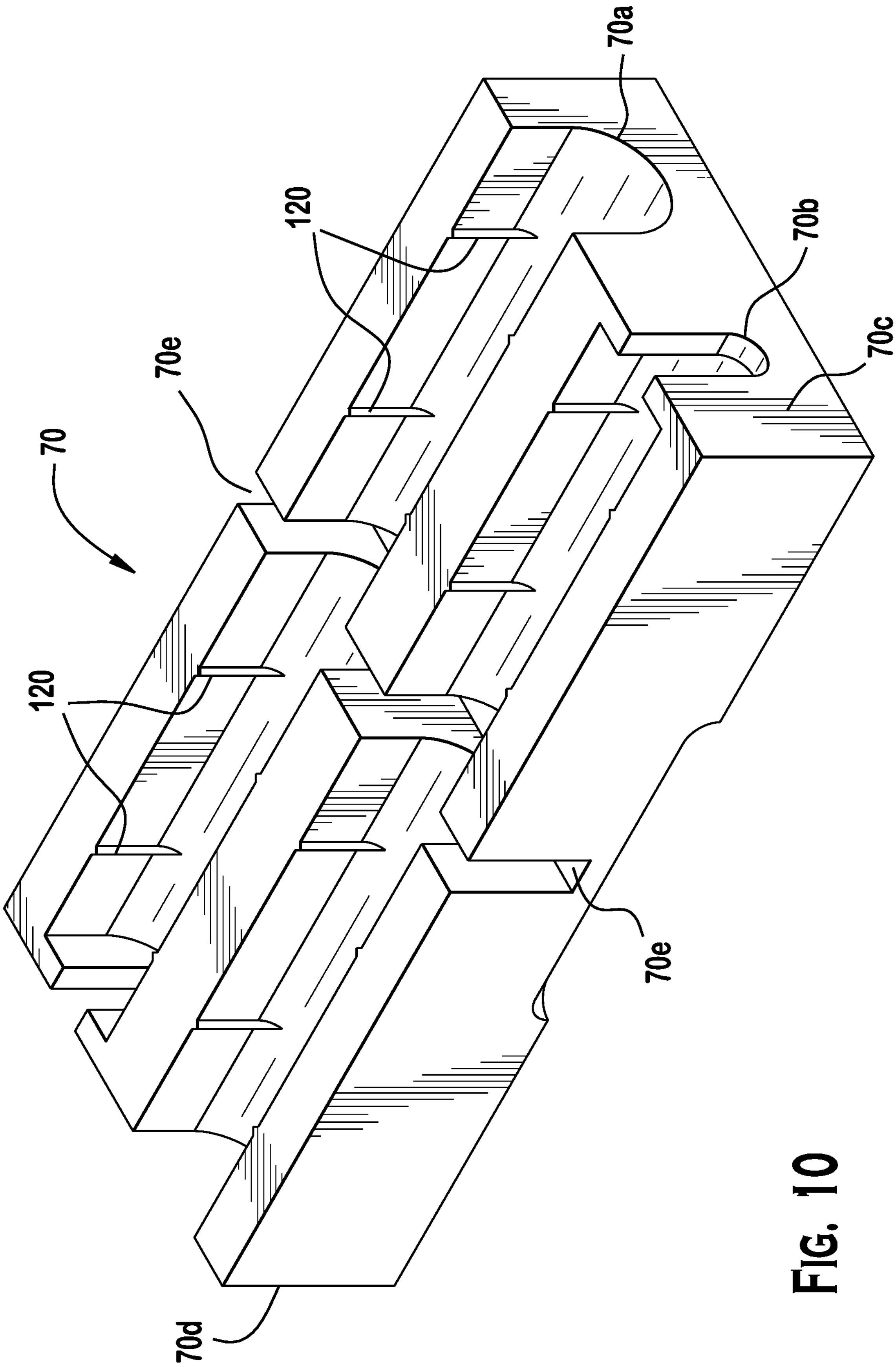
FIG. 10 is a perspective view of a second embodiment of a syringe housing of a bodily fluid transporting unit constructed in accordance with the present invention.
Figure 13:
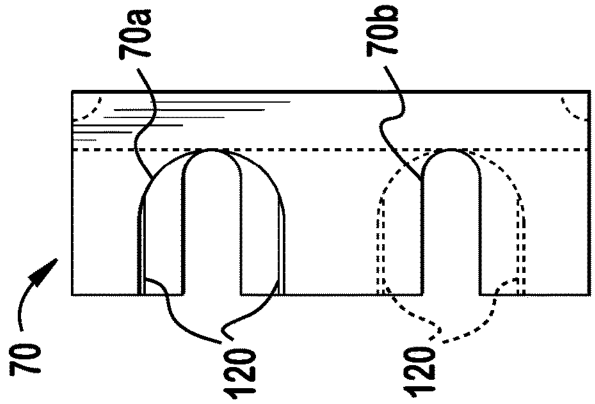
FIG. 13 is an end view of the FIG. 10 syringe housing.
Figure 11:
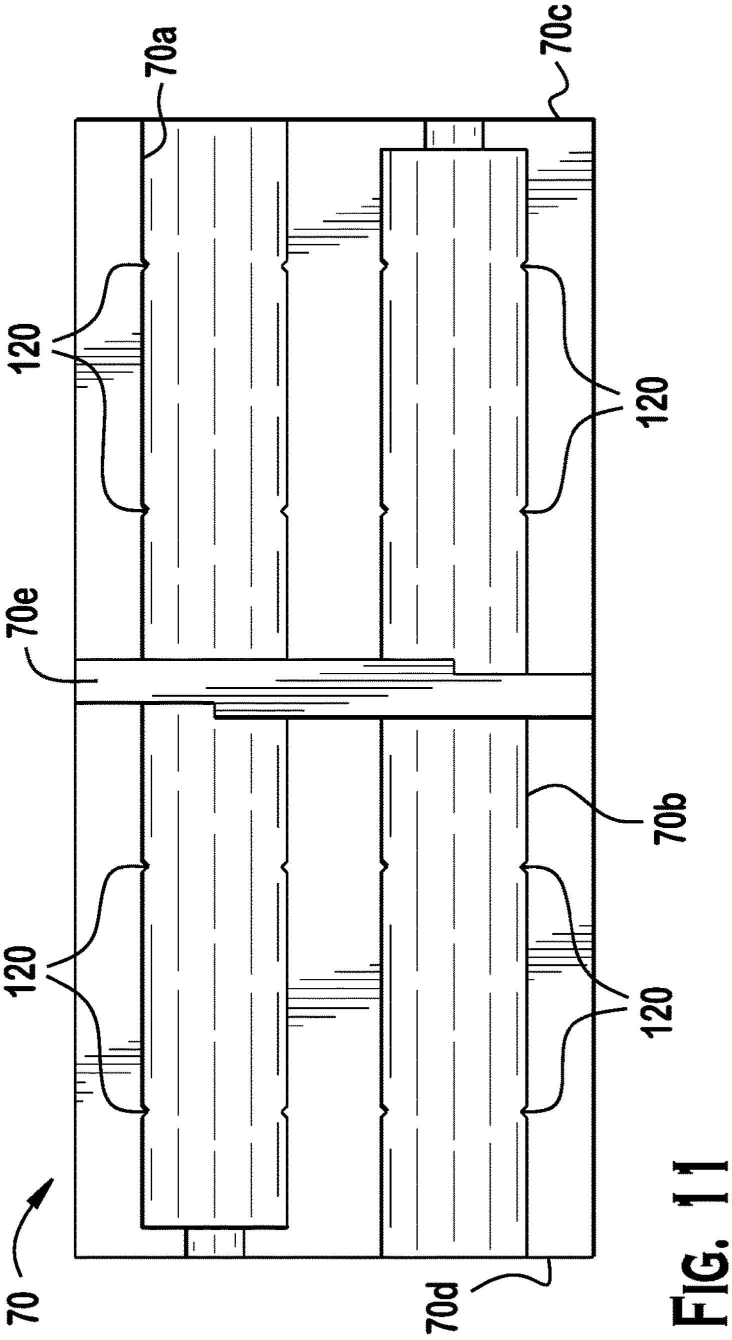
FIG. 11 is a top view of the FIG. 10 syringe housing.
Figure 12:
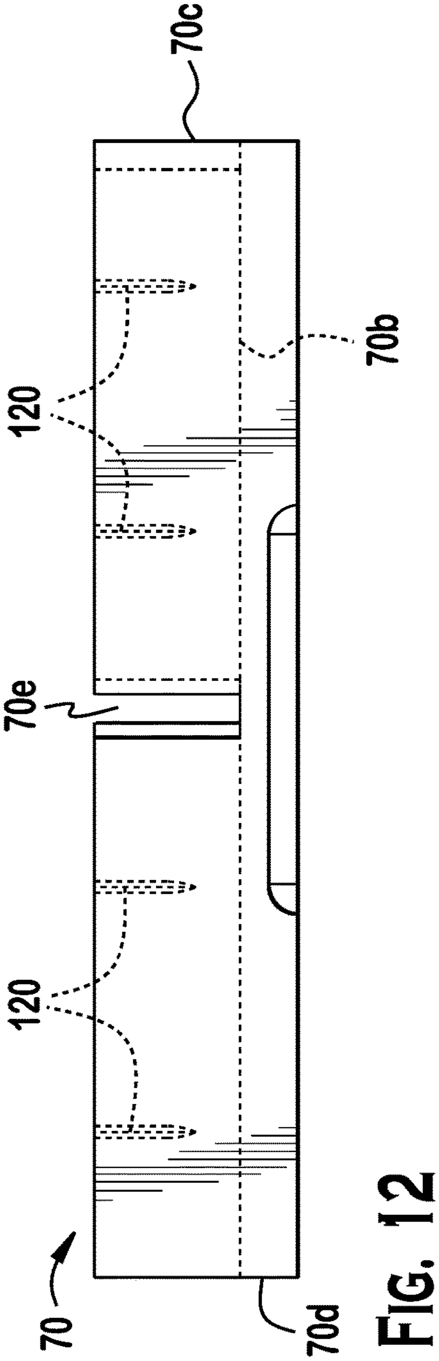
FIG. 12 is a side view of the FIG. 10 syringe housing.
Figure 14:
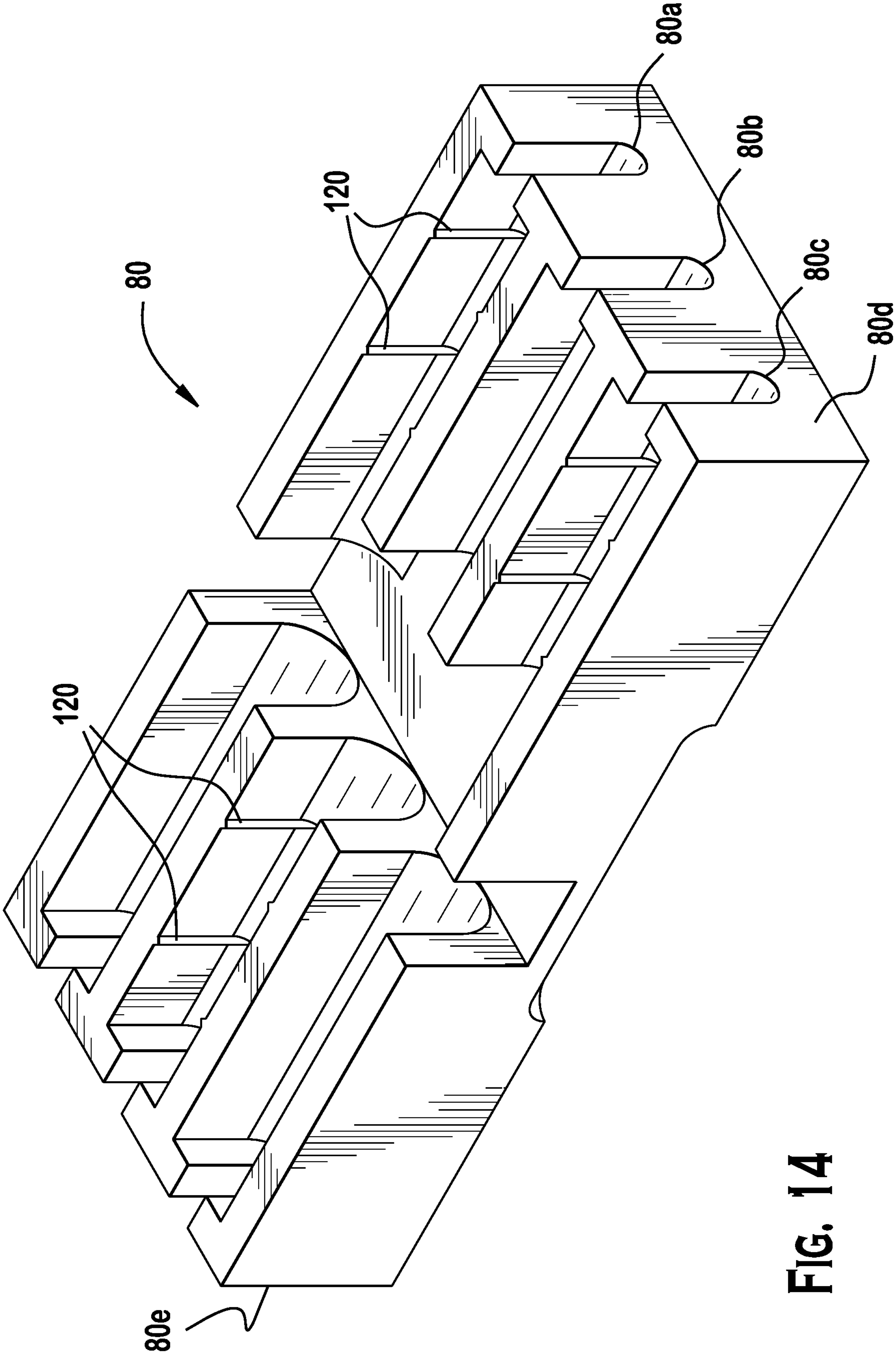
FIG. 14 is a perspective view of a third embodiment of a syringe housing of a bodily fluid transporting unit constructed in accordance with the present invention.
Figure 17:
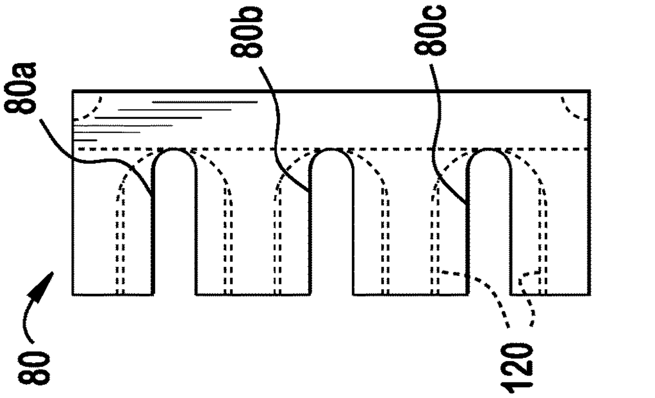
FIG. 17 is an end view of the FIG. 14 syringe housing.
Figure 15:
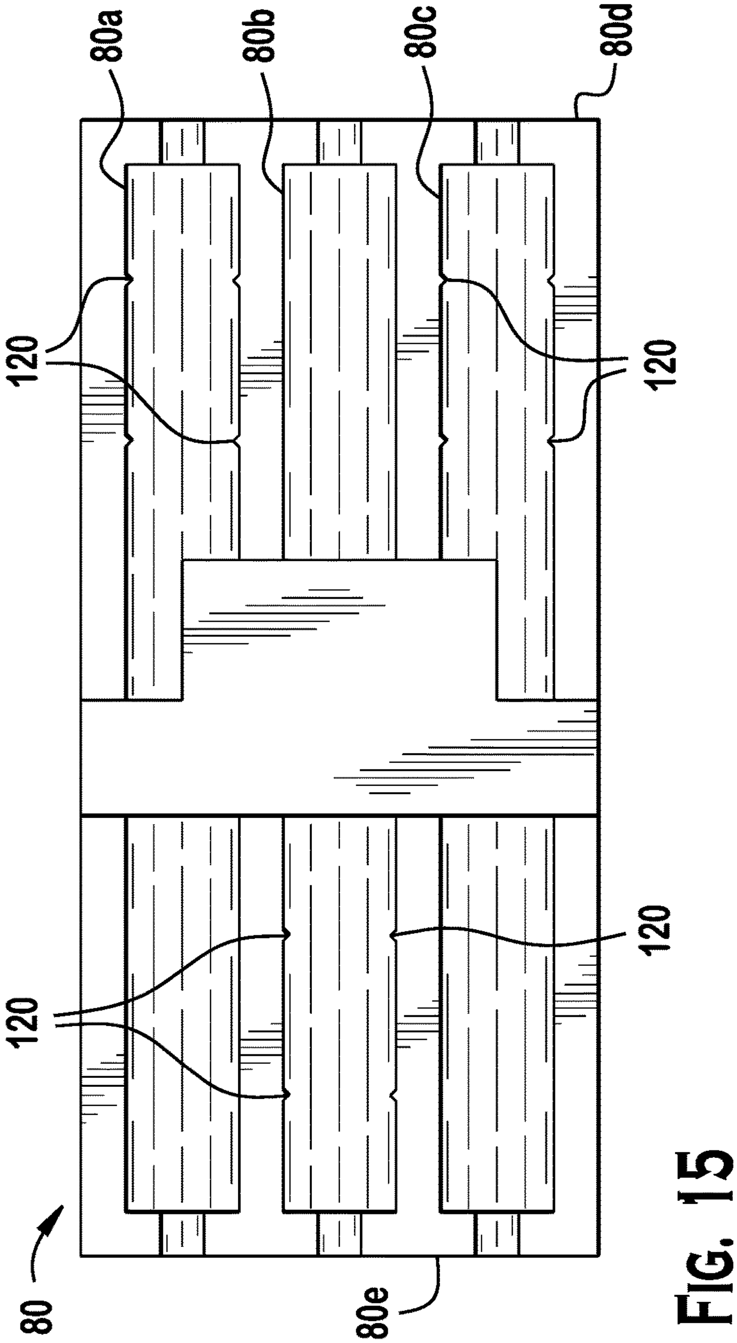
FIG. 15 is a top view of the FIG. 14 syringe housing.
Figure 16:
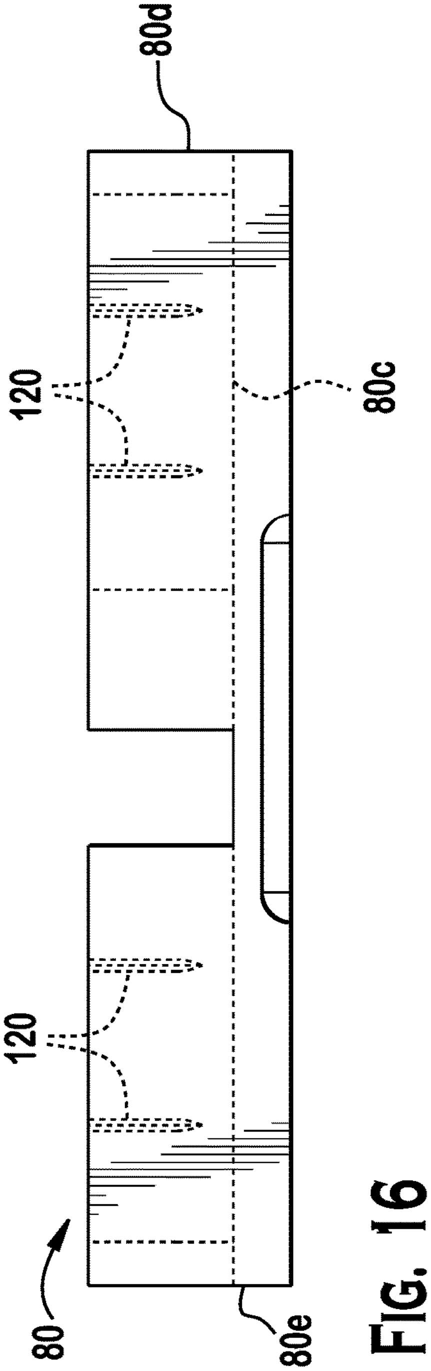
FIG. 16 is a side view of the FIG. 14 syringe housing.

As illustrated in FIGS. 4 and 5, refrigerant pack 50 rests on a syringe housing, for example syringe housing 60. Only a portion of refrigerant pack 50 is shown in FIG. 4 and only a portion of lid 40 is shown in FIG. 5. Although any suitable coolant or refrigerant pack capable of achieving the desired cooling rate may be used in a bodily fluid transporting unit constructed in accordance with the present invention, a solid foam-type coolant is preferred.

Figure 18:
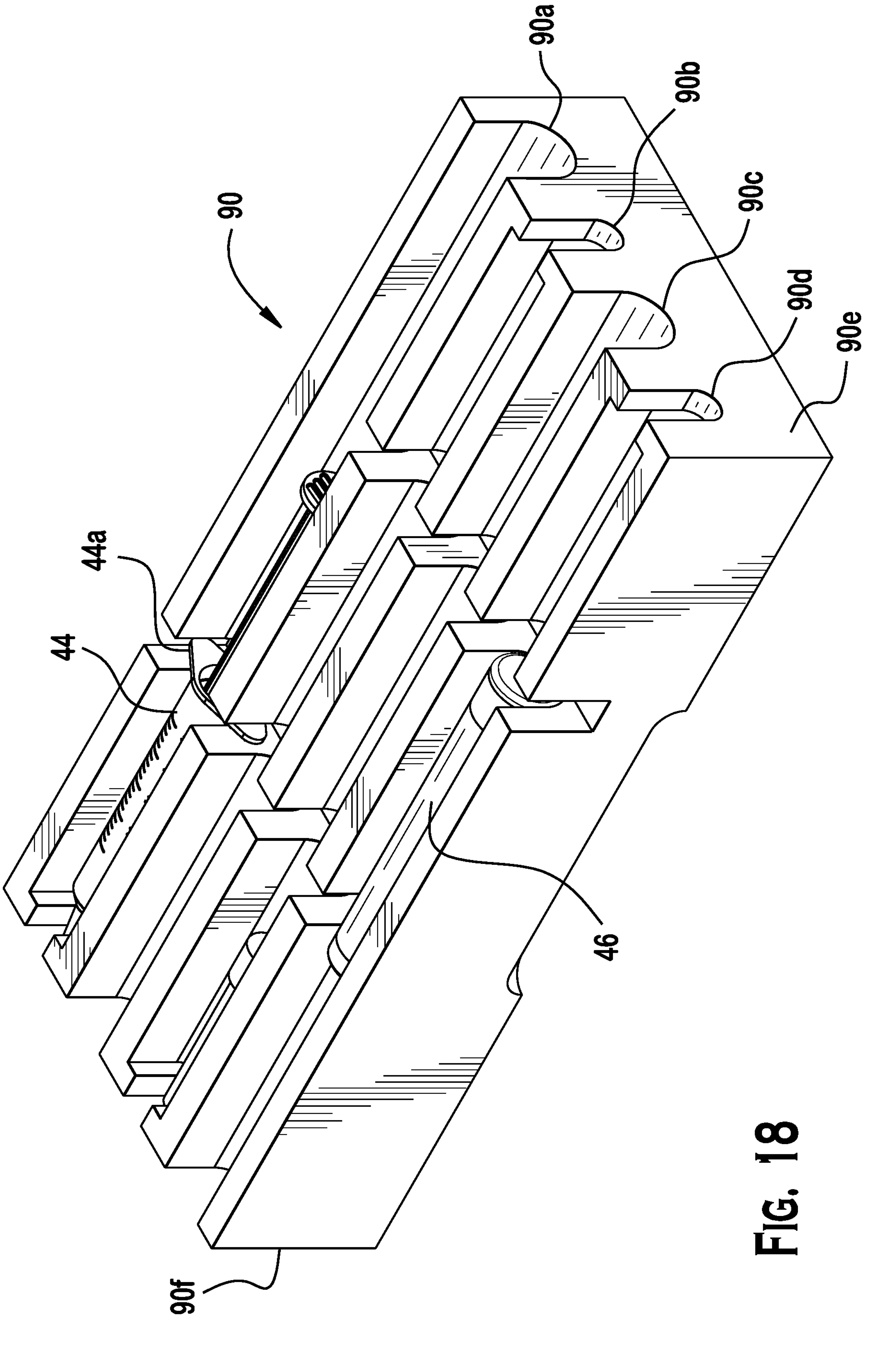
FIG. 18 is a perspective view of a fourth embodiment of a syringe housing of a bodily fluid transporting unit constructed in accordance with the present invention with a syringe and a test vial stored in the syringe housing.
Figure 21:
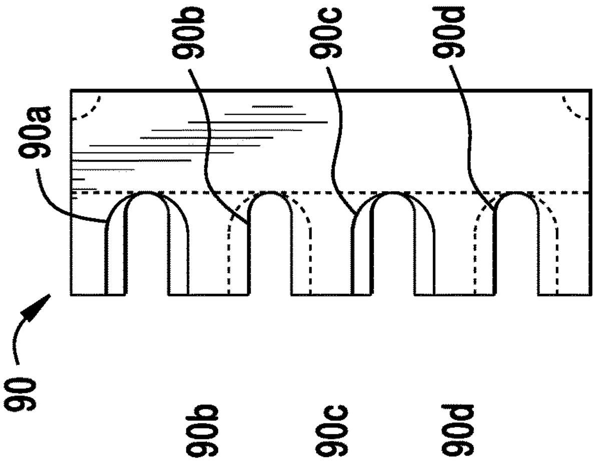
FIG. 21 is an end view of the FIG. 18 syringe housing.
Figure 19:
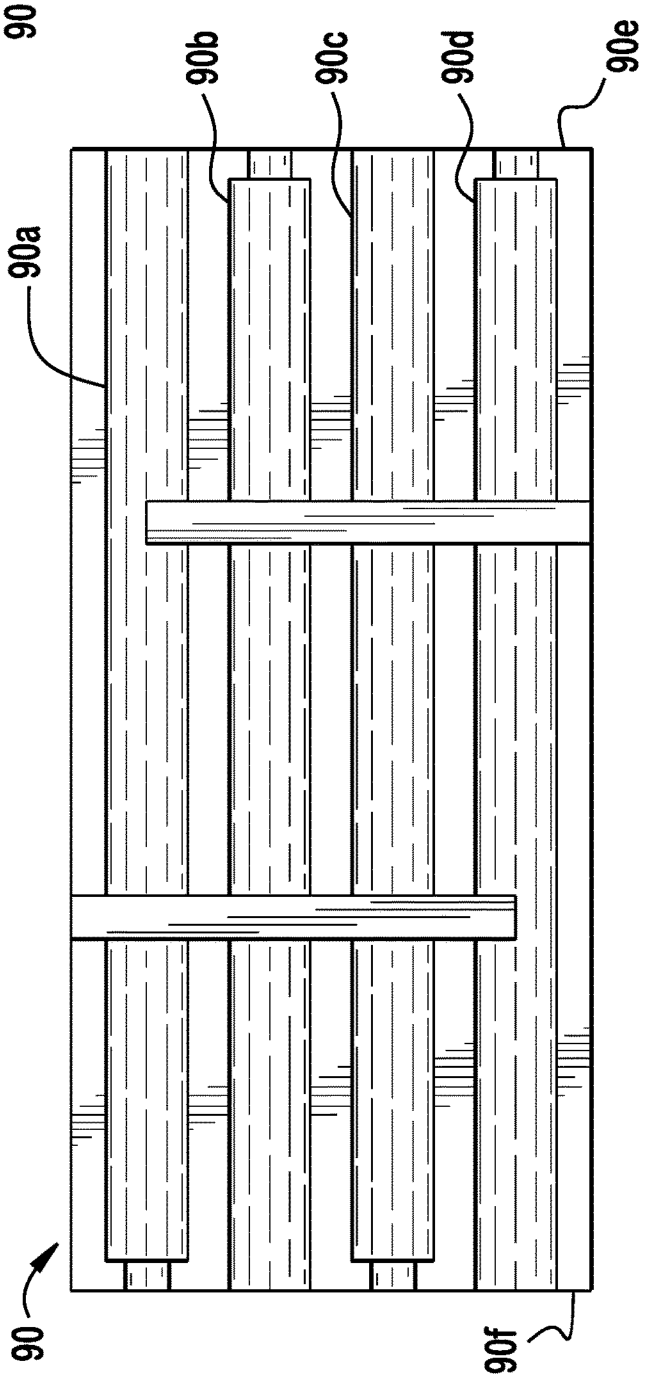
FIG. 19 is a top view of the FIG. 18 syringe housing.
Figure 20:
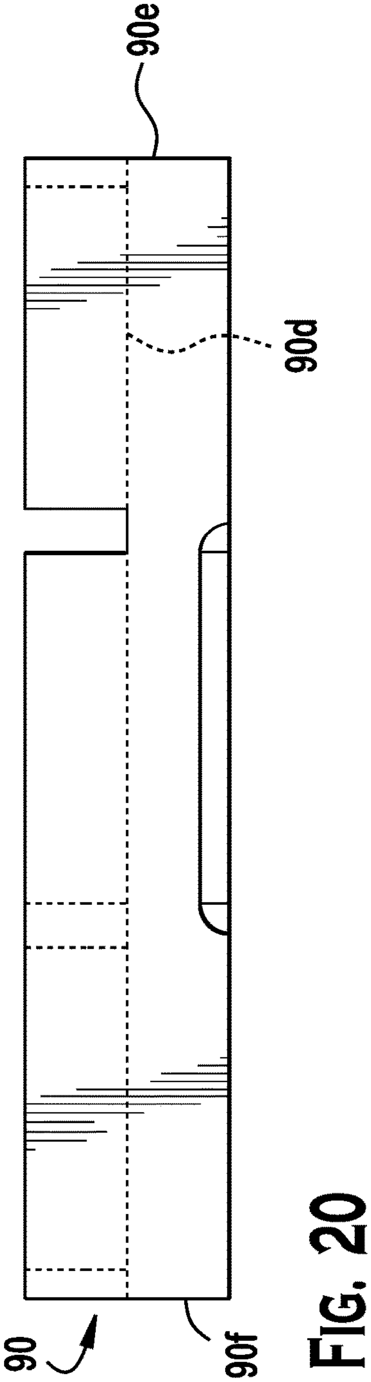
FIG. 20 is a side view of the FIG. 18 syringe housing.
Figure 22:
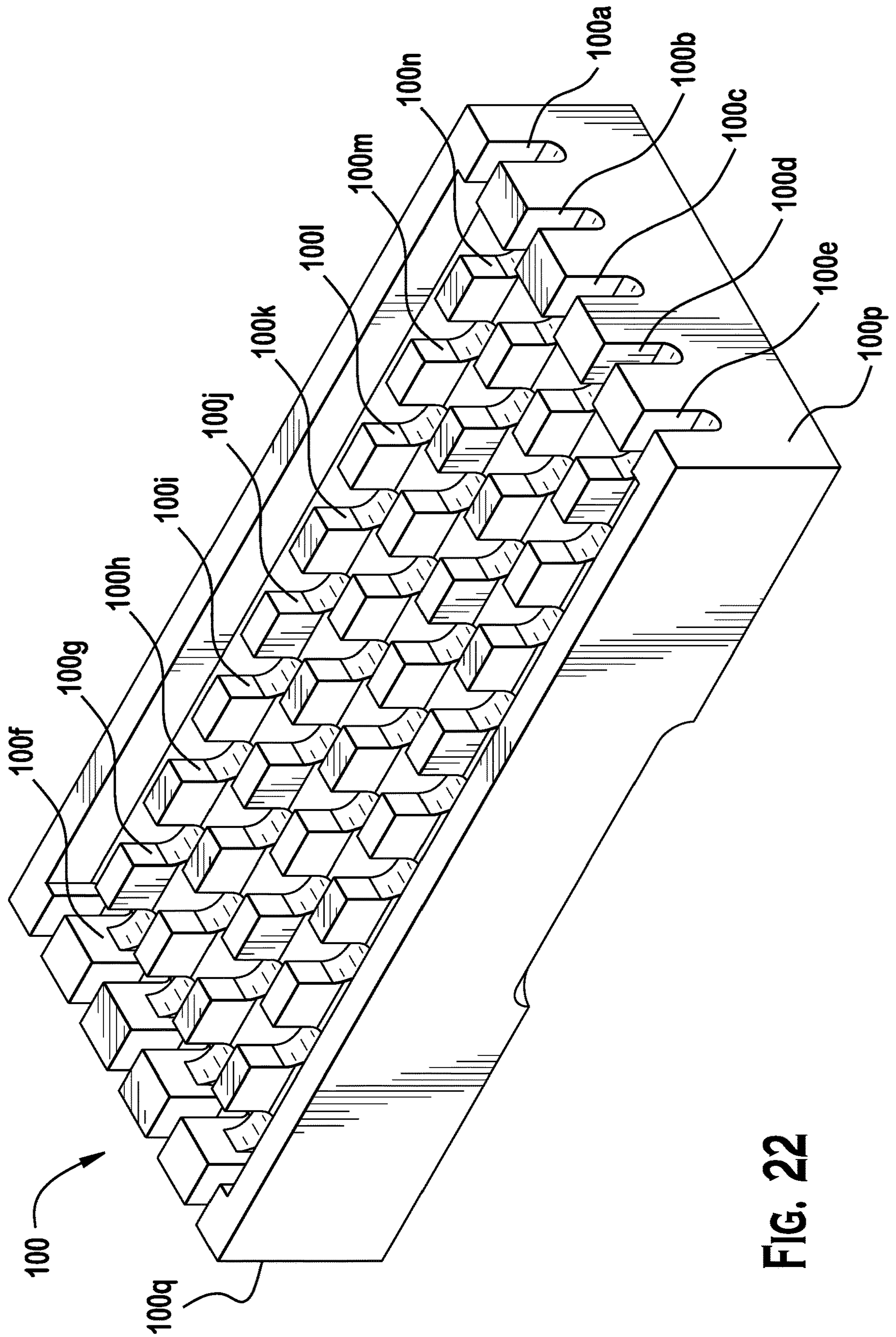
FIG. 22 is a perspective view of a fifth embodiment of a syringe housing of a bodily fluid transporting unit constructed in accordance with the present invention.
Figure 25:
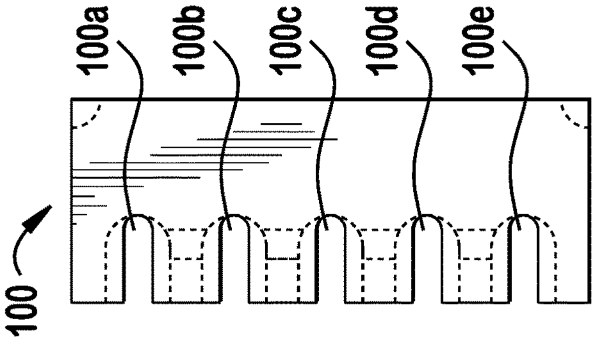
FIG. 25 is an end view of the FIG. 22 syringe housing.
Figure 23:
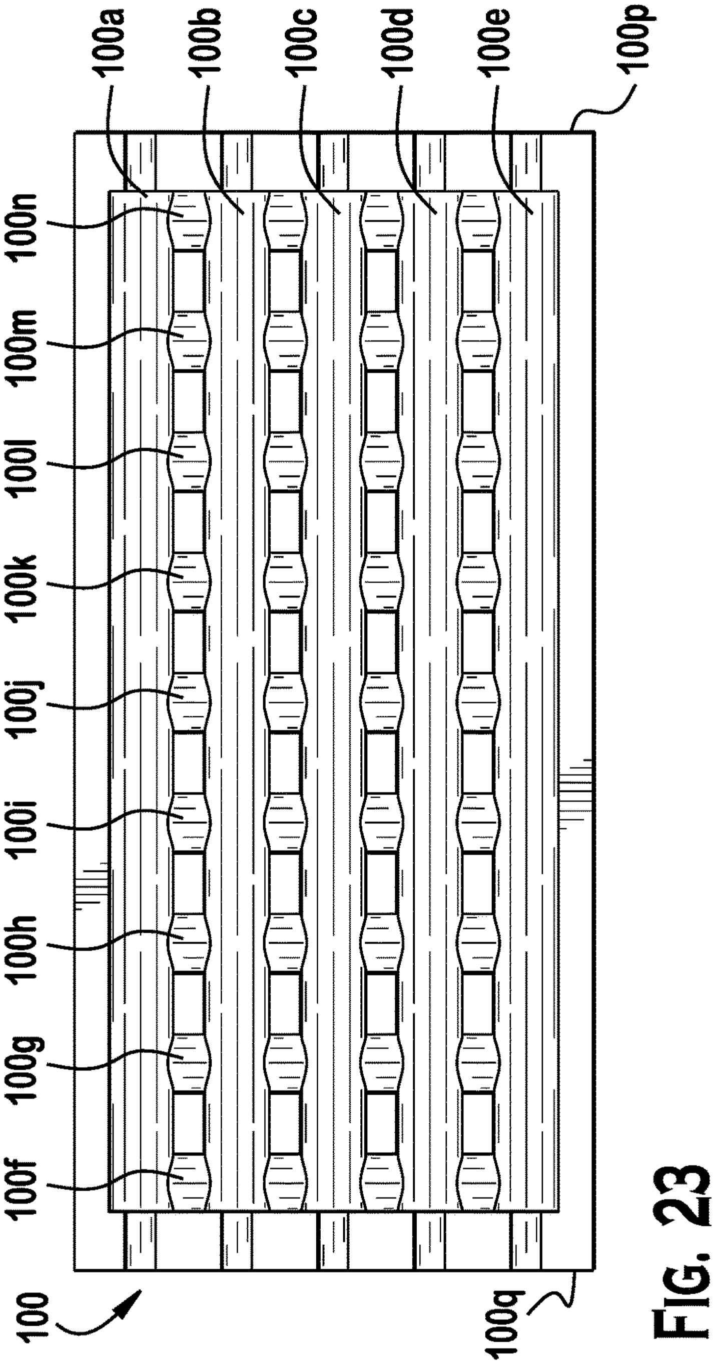
FIG. 23 is a top view of the FIG. 22 syringe housing.
Figure 24:
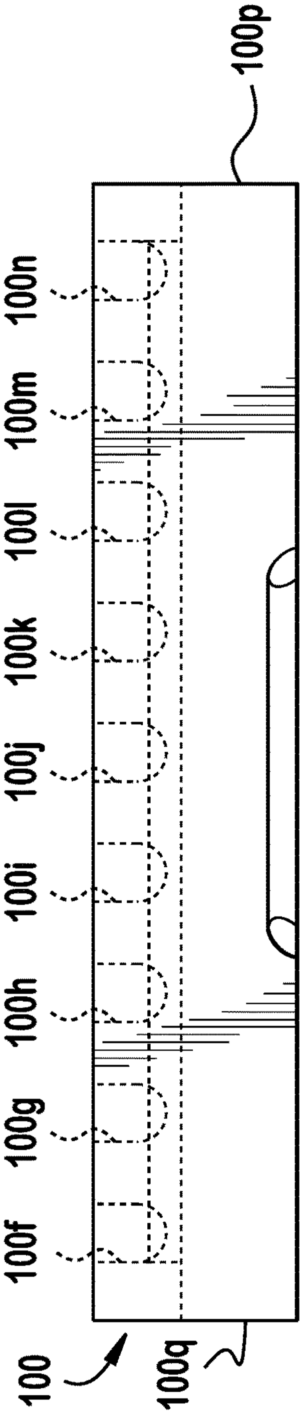
FIG. 24 is a side view of the FIG. 22 syringe housing.

FIGS. 6 through 25 are various views of the five syringe housings 60, 70, 80, 90, and 100 illustrated in FIG. 1. It should be understood that users of a bodily fluid transporting unit, constructed in accordance with the present invention, may select the number of syringe housings and the specific syringe housing(s) to be included in the bodily fluid transporting unit to satisfy the specific needs and preferences of the users on how semen is to be transported. For example, as shown in FIG. 18, a user of bodily fluid transporting unit, constructed in accordance with the present invention, may choose to transport various combinations of one or more syringes 44 and one or more test vials 46. It also should be understood that an element, feature, detail, or aspect of any particular syringe housing that is illustrated and described can be included in one or more of the other syringe housings that are illustrated and described or included in another syringe housing that is neither specifically illustrated nor described. Syringe housings preferably are made from polystyrene. However, one skilled in the art should appreciate that various materials, known for their insulation can be used.

Referring to FIGS. 6 through 9, syringe housing 60 has a U-shape passage 60*a* extending along first length 60*b* of the syringe housing and a circular passage 60*c* extending along a second length 60*d* of the syringe housing. This construction of syringe housing 60 permits insertion of a syringe into the syringe housing through the U-shape first length 60*b* of the syringe housing and retention of the syringe in the syringe housing by the circular second length 60*d* of the syringe housing. As illustrated in FIG. 1, syringe housing 60 can be composed of two oppositely disposed syringe housings, one of which is illustrated in FIGS. 6 through 9. Syringe housing 60 can accommodate combinations of syringes and test vials, such a two syringes or one syringe and two test vials.

Referring to FIGS. 10 through 13, syringe housing 70 has two oppositely disposed U-shape passages 70*a* and 70*b*. The width of U-shape passage 70*a* at end 70*c* of syringe housing 70 is larger than the width of U-shape passage 70*a* at end 70*d* of the syringe housing. The width of U-shape passage 70*b* at end 70*d* of syringe housing 70 is larger than the width of U-shape passage 70*b* at end 70*c* of the syringe housing. A passage 70*e* at the middle of syringe housing 70, extending transverse to the U-shape passages 70*a* and 70*b*, is offset to provide space for the barrel flange(s) 44*a* (see FIG. 18) if two syringes are stored in the syringe housing. Syringe housing 70 can accommodate various combinations of syringes and test vials, such as two syringes or one syringe and two test vials.

Referring to FIGS. 14 through 17, syringe housing 80 has three U-shape passages 80*a*, 80*b*, and 80*c*. The width of U-shape passage 80*a* at end 80*d* is the same as the width of U-shape passage 80*a* at end 80*e*. The width of U-shape passage 80*b* at end 80*d* is the same as the width of U-shape passage 80*b* at end 80*e*. The width of U-shape passage 80*c* at end 80*d* is the same as the width of U-shape passage 80*c* at end 80*e*. Syringe housing 80 can accommodate various combinations of syringes and test vials, such a three syringes or two syringes and two test vials.

Referring to FIGS. 18 through 21, syringe housing 90 has four U-shape passages 90*a*, 90*b*, 90*c*, and 90*d*. The width of U-shape passage 90*a* at end 90*e* is larger than the width of U-shape passage 90*a* at end 90*f*. The width of U-shape passage 90*b* at end 90*e* is smaller than the width of U-shape passage 90*b* at end 90*f*. The width of U-shape passage 90*c* at end 90*e* is larger than the width of U-shape passage 90*c* at end 90*f*. The width of U-shape passage 90*d* at end 90*e* is smaller than the width of U-shape passage 90*d* at end 90*f*. Syringe housing 90 can accommodate various combinations of syringes and test vials, such a syringe 44 and a test vial 46, or three syringes and two test vials.

Referring to FIGS. 22 through 25, syringe housing 100 has five U-shape passages 100*a*, 100*b*, 100*c*, 100*d*, and 100*e* extending along the length of the syringe housing and nine U-shape passages 100*f*, 100*g*, 100*h*, 100*i*, 100*j*, 100*k*, 1001, 100*m*, and 100*n* extending transverse to U-shape passages 100*a*, 100*b*, 100*c*, 100*d*, and 100*e*. The widths of each U-shape passage 100*a*, 100*b*, 100*c*, 100*d*, and 100*e* at their respective ends 100*p* and 100*q* is the same. Syringe housing 100 can accommodate various combinations of syringes and test vials, such a three syringes and four test vials or four syringes and two syringes or five syringes.

Syringe housings 70 (FIGS. 10 through 13), 80 (FIGS. 14 through 17), 90 (FIGS. 18 through 21), and 100 (FIGS. 22 through 25) are open to receive syringes and test vials which make syringes and test vials that are placed in these syringe housings susceptible to falling out of the syringe housings during transport of a bodily fluid.

It is important that syringes and test vials stored in a syringe housing remain in place while the bodily fluid transporting unit is moved from one location to another. Consequently, the syringe housing should be designed to assure that syringes and test vials do not fall out of the syringe housing or are not displaced in the syringe housing when the bodily fluid transporting unit is exposed to commonly expected hazards, such as being dropped by a handler or displaced in a vehicle carrying the bodily fluid transporting unit.

In accordance with the present invention, syringes and test vials are friction-fit in the passages in the syringe housings, so that the resilient walls that define the passages bear against to syringes and the test vials. To enhance retention of syringes and test vials in syringe housings constructed in accordance with the present invention, the syringe housings preferably include one or both:

Positive retention of syringes and test vials in the syringe housing by completely surrounding at least a portion of the syringe and at least a portion of the test vial with the syringe housing or a portion of the syringe housing. See the syringe housing of FIGS. 6 through 9.

Enhancement of the friction-fit of the syringe and the friction-fit of test vial in the syringe housing by ribs 120 that project from the walls that define the various passages that extend along the lengths of syringe housings. See syringe housing 70 in FIGS. 10, 11, and 12) and syringe housing 80 in FIGS. 14, 15, and 16). Ribs 120 increase the friction-fit by increasing the normal force of the ribs 120 on the syringe and the test vial.

The foregoing illustrates some of the possibilities for practicing the invention. Many other embodiments are possible within the scope and spirit of the invention. It is, therefore, intended that the foregoing description be regarded as illustrative rather than limiting and that the scope of the invention is given by the appended claims together with their full range of equivalents.

What is claimed is:

1. A bodily fluid transporting unit comprising;

a container having:

(a) a chamber, and (b) a top surface having:

(1) a ridge surrounding the chamber of the container, and (2) a groove surrounding the ridge surrounding the chamber of the container;

a refrigerant pack in the chamber of the container;

a removable syringe housing positionable in the chamber of the container, the syringe housing having a unitary walled U-shape passage extending along a first length of the syringe housing adjacent the refrigerant pack and a circular passage extending along a second length of the syringe housing, and corresponding with the U-shape passage such that a lower portion of the U-shaped passage continuously extends linearly into the circular passage, the circular passage adapted to friction fit with a syringe inserted first through the u-shaped passage and into the circular passage; and a lid having:

(a) a bottom surface, (b) a ridge on the bottom surface of the lid extending into the groove surrounding the ridge surrounding the chamber of the container, and (c) a step surrounding the ridge on the bottom surface of the lid and bearing against the top surface of the container in which the lid is positioned coplanar to the top surface.

2. A bodily fluid transporting unit according to claim 1, wherein the syringe housing rests on the bottom of the chamber of the container and the refrigerant pack rests on the syringe housing, a top wall of a second portion of the second length abuts the bottom of the container.

3. A bodily fluid transporting unit according to claim 2, wherein the container and the lid are made from a rigid foamed plastic.

4. A bodily fluid transporting unit according to claim 3, wherein the refrigerant pack is made from a solid foam-type coolant.

5. A bodily fluid transporting unit according to claim 4, wherein the syringe housing is made from polystyrene.

6. A bodily fluid transporting unit according to claim 2, further including a syringe in the syringe housing.

7. A bodily fluid transporting unit according to claim 1, wherein the syringe housing permits insertion of a syringe into the syringe housing through the U-shape passage and retention of the syringe in the syringe housing by the circular passage.

8. A bodily fluid transporting unit according to claim 1, wherein the syringe housing includes two oppositely disposed syringe housings.

9. A bodily fluid transporting unit according to claim 1, further comprising a second removable syringe housing stackable on top of the syringe housing.

10. A bodily fluid transporting unit according to claim 9, wherein the second removable syringe housing is stackable on top of the syringe housing within the container.

11. A bodily fluid transporting unit comprising:

a container having a chamber:

a removable syringe housing positionable in the chamber of the container and having a passage:

(a) extending along the length of the syringe housing, and (b) defined by a unitary resilient wall, the unitary resilient wall having a closed surface along a first length and having a top opening extending along a first portion of a second length forming a u-shaped wall at a first end, a closed surface extending along a second portion of the second length forming a circular shaped passage at a second end of the second portion with the first length, a top wall of the first portion of the second length abutting a bottom surface of the chamber;

a refrigerant pack in the chamber of the container and adjacent the resilient walls;

a syringe friction-fit in the passage of the syringe housing; and a lid so mated with the container and closing the chamber of the container that the chamber of the container is air-tight and moisture-tight.

12. A bodily fluid transporting unit according to claim 11, wherein the syringe housing has oppositely disposed first and second passages with each passage having a U-shape passage formed by the unitary resilient wall extending continuously into the circular passage.

* * * * *